United States Patent
Yamamura et al.

(10) Patent No.: US 7,300,560 B2
(45) Date of Patent: Nov. 27, 2007

(54) CATHODE BLOCK FOR ALUMINUM REFINING AND METHOD FOR PRODUCTION THEREOF

(75) Inventors: Yuji Yamamura, Sakaide (JP); Yoshihiro Fujii, Sakaide (JP); Tsutomu Wakasa, Shizuoka (JP); Shinjiro Toda, Shizuoka (JP)

(73) Assignee: Nippon Electrode Company, Ltd., Shizuoka (JP)

( * ) Notice: Subject to any disclaimer, the term of this patent is extended or adjusted under 35 U.S.C. 154(b) by 191 days.

(21) Appl. No.: 10/530,367

(22) PCT Filed: Feb. 28, 2003

(86) PCT No.: PCT/JP03/02365

§ 371 (c)(1),
(2), (4) Date: Apr. 6, 2005

(87) PCT Pub. No.: WO2004/031451

PCT Pub. Date: Apr. 15, 2004

(65) Prior Publication Data

US 2006/0131169 A1  Jun. 22, 2006

(30) Foreign Application Priority Data

Oct. 7, 2002  (JP) ............................. 2002-293758

(51) Int. Cl.
  *C25B 11/12*  (2006.01)
(52) U.S. Cl. .................. 204/294; 204/280; 204/243.1; 423/448; 423/460
(58) Field of Classification Search ............. 204/243.1, 204/280, 294; 423/448, 460
  See application file for complete search history.

(56) References Cited

U.S. PATENT DOCUMENTS

2002/0000373 A1 *  1/2002  Ninomiya et al. .......... 204/294

FOREIGN PATENT DOCUMENTS

| EP | 0 376 187 A2 | 12/1989 |
|---|---|---|
| JP | 62-065916 | 3/1987 |

\* cited by examiner

*Primary Examiner*—Bruce F. Bell

(57) ABSTRACT

A cathode block for aluminum refining containing a calcined coke in a proportion of 15 to 100 wt %, characterized in that the calcined coke is prepared by mixing a heavy oil having a content of quinoline insoluble components of 10 to 25 wt % with 3 to 20 wt % of carbon black, and subjecting the resultant mixture to coking and then calcination. The cathode block for aluminum refining is excellent in resistance to abrasion and thus has a prolonged life.

23 Claims, No Drawings

CATHODE BLOCK FOR ALUMINUM REFINING AND METHOD FOR PRODUCTION THEREOF

TECHNICAL FIELD

This invention relates to cathode blocks for aluminum refining and its production method.

BACKGROUND ART

As is well known, the cathode parts of aluminum reduction cell which contact with molten aluminum and electrolyte bath are composed of carbon material. Cathode blocks tend to deteriorate due to cracks caused by thermal stress and/or swelling due to sodium penetration during the operation. In addition to this, cathode blocks tend to be abraded and worn due to the movement of sludge, which contains suspended alumina, over the cathode blocks. This movement is caused by the flow of molten alumina by magnetic field. Due to these reasons, cathode blocks can have a short life span and reduction cells can fail.

In order to prolong the life span of cathode blocks, graphitized cathode blocks which are graphitized at over 2000° C. were disclosed and are currently being used (see Patent Document 1: Japanese Patent Laid-open No. sho 52-119615). Graphitized cathode blocks showed an excellent resistance against thermal stress and sodium penetration, and consequently pot failures due to these reasons have been prevented.

[Problem(s) to be Solved]

However, graphite is basically very soft material, therefore, the problem against abrasion is not completely solved. This means life of a pot with graphitized cathode blocks is rather short due to cathode blocks' deterioration caused by abrasion, and it is necessary to improve the abrasion resistance of cathode blocks to attain longer pot life span.

[Object(s) of the Invention]

This invention has been made by considering the fact described above, and the object thereof is to supply cathode blocks with higher abrasion resistance to attain longer pot life span and its manufacturing process.

DISCLOSURE OF THE INVENTION

After having considered several possible solutions for the above problem, we established this invention by using calcined cokes obtained from coking and calcining after mixing crude oil, which contains a certain content of quinoline insoluble, with carbon black.

A first brief summary of this Invention is a cathode block which contains 15 to 100 wt % calcined cokes. The calcined cokes are obtained from coking and calcining after mixing crude oil, which contains 10 to 25 wt % of quinoline insoluble, with 3 to 20 wt % of carbon black.

The second brief summary of this Invention is the manufacturing method of the cathode block which is produced from calcined cokes obtained by coking and calcining after the mixing heavy crude oil containing 10-25 wt % of quinoline insoluble with 3-20 wt % of carbon black. In the manufacturing process of the cathode blocks for aluminum refining, binder pitch is added to the mixture of 15-100 wt % of the calcined cokes and 0-85 wt % of carbonaceous materials, and then to be kneaded, formed, baked and graphitized.

BEST MODE FOR CARRYING OUT THE INVENTION

Following is the detailed explanation of embodiments of the Invention.

The manufacturing process of the cathode blocks for this Invention shall be described below.

This Invention comprises the process of adding binder pitch to the mixture of 15 to 100 wt % of the calcined cokes and 0 to 85 wt % of carbonaceous material, and then kneading, forming, baking and graphitizing.

The characteristics of this Invention are to use calcined cokes obtained by coking and calcining after mixing crude heavy oil containing 10 to 25 wt % of quinoline insoluble with 3 to 20 wt % of carbon black.

<Manufacturing of Calcined Cokes>

Both of petroleum heavy crude oil and coal heavy crude oil can be applicable as the heavy crude oil in this invention. Coal heavy crude oil is coal tar and coal tar pitch, and petroleum heavy crude oil is FCC (fluidized catalytic cracker) residue, EFE (by-product-oil when producing ethylene), atmospheric pressure residue oil and sub-atmospheric pressure residue oil. Coal tar pitch is the best among these and particularly the coal tar pitch with softening point lower than 100° C. which is a by-product from manufacturing process of metallurgical cokes.

In this Invention, heavy crude oil containing 10-25 wt % of quinoline insoluble (QI), preferably 10-20 wt % and the best ratio is 15-20 wt %, shall be used. The objectives of this invention cannot be attained by using heavy crude oil which contains less than 10 wt % of QI. In the case of heavy crude oil containing more than 25 wt % of QI, the viscosity of the heavy crude oil increases and there are some problems for transportation. QI content can be adjusted with any known method, such as gravity sedimentation method, centrifugal method, filtration method, by applying whatever solvent for easier operation. Coal tar pitch with suitably adjusted QI content can be commercially available and applicable to this invention.

Carbon black for rubber processing and for coloring can be applicable to this invention. Typical average particle diameter of carbon black for this invention is over 10 nm, and normally less than 300 nm and preferably less than 100 nm. When the particle size is too small, then it cannot be well mixed with heavy crude oil and increases its viscosity after mixing. Excessive diameter of the carbon black particle is not realistic in commercial production of carbon black. Preferable iodine adsorption is less than 100 mg/g. When iodine adsorption is too big, then it cannot be well mixed with heavy crude oil and increases its viscosity after mixing. The lowest iodine adsorption is normally 20 mg/g. Pelletized carbon black is preferable due to transportation and prevention of dusting problems.

In this Invention, the first step is to mix heavy crude oil with carbon black. It is preferable to use heavy crude oil containing anthracene oil as main component for easier mixture of carbon black. The heavy crude oil with anthracene oil is generated at the coking process, which is explained in detail later.

Preferable mixture process is as follows:

To put the anthracene oil into tank with stirrer.

To add carbon black (CB) for blending.

To charge the mixture of anthracene oil and CB into coker (to be explained later) and to mix (line mixing) heavy crude oil as a raw material.

In this Invention, required mixture ratio of heavy crude oil against carbon black is 3-20 wt % and preferably 3-15 wt %, and the best ratio is 3-10 wt %. In case the mixture ratio of carbon black is less than 3 wt %, then the objectives of this Invention is not attainable, and when the mixture ratio of carbon black is over 20 wt %, then any additional effect of increasing carbon black content cannot be expected and it is not economical.

In this Invention, the next process is to coke the mixture of heavy crude oil and CB obtained by the above method. Coking is to be made by using an equipment so called "delayed coker". In this case, typical temperature is 450-520° C., preferably 460-500° C., typical pressure is less than 1.0 MPa, preferably less than 0.5 MPa, typical coking time is 24-48 hours, preferably 24-36 hours. During this process, heavy crude oil of which main component is anthracene oil shall be generated, however, this heavy crude oil can be utilized as a carrier when mixing of carbon black as previously explained.

Next process in this Invention is to calcine the raw cokes discharged from delayed coker. Calcining is to be made by using rotary kiln, rotary hearth, and others as a calcining furnace. In this process typical temperature is 1300-1500° C., preferably 1400-1500° C., typical time is 1-3 hours.

<Manufacturing of Cathode Blocks for Aluminum Refining>

Calcined cokes obtained by the above method is to be used after crushing and particle size screening. In the meantime, artificial graphite, normal calcined cokes and anthracite are to be used as carbonaceous materials, and binder pitch (with softening point of 80-120° C. and 50-60 wt % of fixed carbon), which are generally used for carbon material production, can be used without any limitation.

In this Invention, binder pitch is added to the mixture of 15-100 wt % of calcined cokes and 0-85 wt % of carbonaceous materials, and then to be kneaded, formed, baked and graphitized. Typical application range of binder pitch to the above mixture is 20-30 wt %. Kneading temperature range is 120-150° C. Forming process is to be made by extrusion or mould method. Baking process is to be made for 10-50 hours at 800-1300° C. in coke breeze. Graphitization is to be made for 5-20 hours at 2400-3000° C. in the graphitizing furnace.

The following is the explanation of cathode blocks for aluminum smelting related to this Invention. Cathode blocks in this Invention shall be manufactured by coking and calcining after mixing the heavy crude oil containing 10-25 wt % of quinoline insoluble with 3-20 wt % of carbon black as calcined cokes explained in the above. Its characteristic is excellent abrasion resistance and has an effect to attain longer pot life span.

EXAMPLES

This Invention's details shall be explained in the following examples but not limited to them as long as it is within the range of its summary.

<Production of Calcined Coke>

Manufacturing Examples 1-5

As a heavy crude oil, coal tar pitch containing QI listed in Table 1 and as a carbon black with average particle diameter of 43 nm, iodine adsorption of 53 mg/g (N550M manufactured by Mitsubishi Chemical) were used respectively.

Firstly, the heavy crude oil, of which main component is anthracene oil, is put into tank with stirrer. Then carbon black is added to be mixed. The obtained mixture of anthracene oil and CB is charged into a delayed coker together with raw material heavy crude oil through in-line mixing method. The ratio between raw material heavy crude oil and carbon black is adjusted in accordance with Table 1.

Continuously charging the mixture of anthracene oil and carbon black and raw material heavy crude oil into delayed coker by coking for 24 hours at 480° C., raw coke is obtained.

The raw coke from the delayed coker is supplied into the rotary kiln, followed by calcining for 1.5 hours at 1500° C. to obtain preliminary calcined coke. A block is formed as per the following method to evaluate the coke. The result of the evaluation is shown in Table 1.

(Manufacturing of Block)

30 wt % (external ratio) of binder pitch is added to the calcined coke and kneaded, and then a specimen block is formed into 60 mm diameter and 120 mm length with 50MT mould press. Then the specimen is machined to 20 mm diameter and 120 mm length. After baking for 15 hours at 1000° C., the specimen block is graphitized for 1 hour at 2800° C. And finally the specimen is machined to 20 mm diameter and 100 mm length.

(Evaluation Method)

(1) HGI of calcined cokes:

As per JIS M8801-5 Test Method for Grindability (2) CTE of block (longitudinal):

The measurement was undertaken by heating from 30 to 130° C. at 10° C./min.

<Manufacturing of Cathode Blocks for Aluminum Refining>

Embodiments 1-2 and Comparisons 1-4

By using pitch cokes (hereinafter referred as cokes A-E) obtained by manufacturing examples 1-5, cathode blocks for aluminum refining is manufactured as follows.

24 wt % of binder pitch is added to each pitch cokes listed in Table 2

After kneading by using the kneader at 130° C., cathode blocks are formed into 155×185×600 mm.

The cathode blocks are baked for 40 hours at 1200° C. and graphitized for 15 hours at 2900° C.

The result of evaluation by the following method is shown in Table 2.

(1) Bulk Density of Cathode Blocks (g/cm$^3$):

It is measured as per JIS R 7212-6 "Test Method for Bulk Density."

(2) Specific Resistivity of Cathode Blocks:

It is measured as per JIS R 7202-6.2.2 (1) "Kelvin Double Bridge Method."

(3) Abrasion of Cathode Blocks (%):

Cathode block specimen is machined to cylinder shape with 25 mm diameter and 80 mm length. Alumina particle slurry is put into a cylinder container and a stirrer is placed at the center of the container. A test specimen is connected to an electric motor and put it into slurry of cylinder container. The test specimen is rotated at 240 rpm in the reverse direction of the cylinder container rotation, which is at 15 rpm. The test duration by rotation is 4 hours, and then abrasion amount is evaluated by measuring the specimen volume change by water displacement volume method.

TABLE 1

|  |  | Manufacturing examples | | | | |
| --- | --- | --- | --- | --- | --- | --- |
|  |  | 1 | 2 | 3 | 4 | 5 |
| Raw material pitch | QI (weight %) | 15 | 5 | 15 | 15 | 8 |
| Carbon black | Addition (weight %) | 5 | 5 | 0 | 2 | 0 |
| Cokes characteristics | HGI | 20.7 | 30.0 | 22.0 | 21.5 | 25.0 |
| Block characteristics | CTE ($\times 10^{-7}/°$ C.) | 39.2 | 26.0 | 35.0 | 37.0 | 22.5 |

TABLE 2

|  | Embodiment examples | | Comparison examples | | | |
| --- | --- | --- | --- | --- | --- | --- |
|  | 1 | 2 | 1 | 2 | 3 | 4 |
| Cokes type | A | A: 40 wt % E: 60 wt % | B | C | D | E |
| Bulk density (g/cm$^3$) | 1.58 | 1.62 | 1.62 | 1.67 | 1.64 | 1.64 |
| Specific resistivity (μΩm) | 13.5 | 11.5 | 10.1 | 12.8 | 13.0 | 10.5 |
| Abrasion amount (%) | 28.3 | 32.4 | 44.0 | 36.6 | 36.0 | 41.3 |

INDUSTRIAL APPLICABILITY

By the above Invention, cathode blocks with excellent abrasion resistance for longer pot life span and its manufacturing method can be supplied, and its industrial value is significant.

The invention claimed is:

1. A graphitized cathode block for aluminum refining prepared from 15 to 100 wt % of calcined coke, characterized in that the calcined coke is prepared by coking and calcining after mixing heavy crude oil containing 10 to 25 wt % of quinoline insoluble with 3 to 20 wt % of carbon black and subsequently graphitized to provide a structure and density that provides improved resistance to abrasion loss during aluminum refining.

2. The graphitized cathode block for aluminum refining according to claim 1, wherein the heavy crude oil is coal tar pitch.

3. The graphitized cathode block for aluminum refining according to claim 1, wherein the heavy crude oil contains quinoline insoluble at 15 to 20 wt %.

4. The graphitized cathode block for aluminum refining according to claim 1, wherein the average particle diameter of the carbon black is more than 10 nm.

5. The graphitized cathode block for aluminum refining according to claim 1 wherein the bulk density is less than 1.62 g/cm$^3$ and the specific resistivity is greater than 13 μΩm.

6. The graphitized cathode block for aluminum refining according to claim 1 wherein the cathode block is graphitized.

7. The graphitized cathode block for aluminum refining according to claim 6 wherein the cathode block is in a cylinder shape.

8. The graphitized cathode block for aluminum refining according to claim 7 wherein the abrasion is less than 33% in volume when rotated in an alumina particle slurry at 240 rpm for a period of four hours.

9. A method of manufacturing a cathode block for use in aluminum refining comprising the steps of:
    calcining a coke pre-form having a mixture of a heavy crude oil containing 10 to 25 wt % of quinoline insoluble and a carbon black, the carbon black being 3 to 20 wt % of the mixture;
    crushing the calcined coke pre-form;
    mixing the crushed calcined coke with a binder pitch and carbonaceous material;
    forming a block of the mixture of calcined coke, carbonaceous material and binder pitch;
    baking the block of calcined coke, carbonaceous material and binder pitch at a temperature between 800° to 1300° C. for at least 10 hours; and
    graphitizing the baked block at a temperature between 2400° to 3000° C. for at least 5 hours.

10. The method of manufacturing of claim 9 further including cutting the cathode block into a cylinder.

11. The method of manufacturing of claim 9 wherein the mixture of crushed calcined coke, binder pitch and carbonaceous material is kneaded at a temperature in the range of 120° C. to 150° C. before being formed into a block.

12. The method of manufacturing of claim 9 wherein calcining is performed at a temperature range of 1300° C. to 1500° C. for a time period of 1 to 3 hours.

13. The method of manufacturing of claim 9 wherein the carbon black is within a range of 3 to 5 wt % and the quinoline insoluble is within a range of 15 to 20 wt %.

14. The method of manufacturing of claim 13 wherein an average particle diameter of the carbon black is between 10 nm and 100 nm.

15. The method of manufacturing of claim 14 wherein iodine adsorption is less than 100 mg/g of carbon black.

16. The method of manufacturing of claim 9 wherein the calcined coke and carbonaceous material are mixed with 24 wt % of binder pitch.

17. The method of manufacturing of claim 9 wherein the mixture of crushed calcined coke, binder pitch and carbonaceous material is kneaded at a temperature of 130° C. before being formed into a block.

18. The method of manufacturing of claim 9 wherein the block of calcined coke, carbonaceous material and binder pitch is baked at 1200° C. for 40 hours.

19. The method of manufacturing of claim 9 wherein the baked block is graphitized at 2900° C. for 15 hours.

20. A graphitized cathode block for aluminum refining is prepared with 15 to 100 wt % of calcined coke, and characterized in that the calcined coke is prepared by coking and calcining after mixing heavy crude oil containing 10 to 25 wt % of quinoline insoluble with 3 to 20 wt % of carbon black, after graphitizing, the graphitized cathode block has a resulting structure and density to exhibit an abrasion loss of material of less than 33% in volume when subject to an abrasion test of rotation in an aluminum particle slurry at 240 rpm for a period of four hours.

21. The graphitized cathode block of claim 20 wherein a bulk density of the graphitized cathode block is 1.58 g/cm$^3$.

22. The graphitized cathode block of claim 21 wherein the volume of abrasion loss is 28%.

23. A manufacturing process of a cathode block for aluminum refining by adding binder pitch to the mixture of 15 to 100 wt % of calcined coke and 0 to 85 wt % of carbonaceous material, and then kneading, forming, baking and graphitizing, wherein the calcined coke is prepared by coking and calcining after mixing heavy crude oil containing 10 to 25 wt % of quinoline insoluble with 3 to 20 wt % of carbon black.

* * * * *